Figure 1:
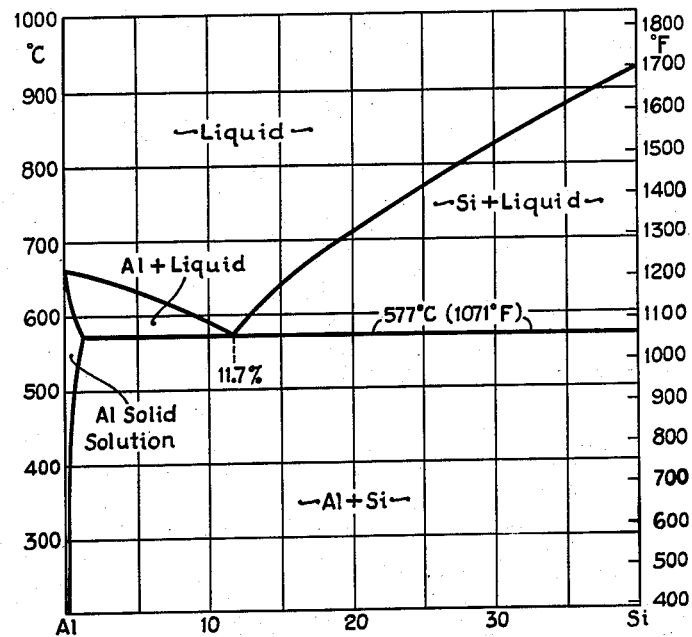

HAROLD H. BLOCK,
INVENTOR.

BY John H.Y. Wallace

Patented Mar. 16, 1954

2,671,958

UNITED STATES PATENT OFFICE 2,671,958

PROCESS OF JOINING METAL PARTS CONSISTING OF ALUMINUM AND ITS ALLOYS

Harold H. Block, Los Angeles, Calif., assignor to The Garrett Corporation, Los Angeles, Calif., a corporation of California Application March 20, 1950, Serial No. 150,753

4 Claims. (Cl. 29—377)

This invention relates to the art of dip brazing aluminum and aluminum alloys in mixtures of aluminum and silicon. More particularly it relates to dip brazing aluminum and its alloys in hyper-eutectic mixtures of aluminum and silicon at relatively low temperatures.

This application is a continuation-in-part of my co-pending application, Serial No. 632,589, filed December 3, 1945, now abandoned.

In the brazing of light metals such as aluminum and aluminum alloys, it is desirable to effect the brazing at temperatures as low as possible consistent with attaining a satisfactory bond. The brazing temperature must be kept below the temperature of fusion or incipient melting of the aluminum or its alloy, since temperatures in this range cause damage or undesirable changes in the structure of the metal. Furthermore, even though the brazing temperature be maintained below the temperature of fusion of the metal, another serious difficulty is frequently encountered due to the strong affinity of the brazing alloy for the parent base metals, with the consequent danger of alloying too extensively and thereby burning through the base metal where sections are thin.

Since alloys of aluminum and silicon form very satisfactory brazing alloys, it has heretofore been proposed to use a eutectic mixture of aluminum and silicon which comprises 88.3% of aluminum and 11.7% of silicon. Such a brazing alloy seems particularly desirable in theory for the reason that it melts at the relatively low temperature of approximately 577° C., (1071° F.) and it would appear, therefore, that it should be possible to conduct the brazing at that temperature. However, efforts to conduct the brazing at or about 577° C. (1071° F.) with the eutectic mixture of aluminum and silicon have resulted in premature solidification of the filler alloy, which has prevented attaining a satisfactory bond. This difficulty has been encountered in spite of the fact that the aluminum surfaces to be brazed have been pre-heated to the melting temperature of the eutectic mixture of aluminum and silicon which constitutes the brazing alloy. It has been ascertained that the reason for this premature solidification of the filler alloy lies in the fact that aluminum is absorbed by the brazing alloy from the aluminum surfaces to be joined. This absorption of the aluminum by the brazing alloy raises the percentage of its aluminum above that of the eutectic mixture and consequently raises the liquidus temperature of the filler alloy. Lack of means whereby the low melting point of the aluminum silicon eutectic might be availed of in brazing operations has thus constituted a major problem in the art.

It is accordingly an object of this invention to provide a method of dip brazing aluminum and aluminum alloy materials at relatively low temperatures.

It is a further object of the invention to provide a low temperature process of dip brazing aluminum and aluminum alloy materials wherein solidification of the filler metal, i. e. the brazing alloy adhering to the surfaces to be joined, is effected in the brazing bath.

It is a further object of the invention to provide a method for carrying out the dip brazing of aluminum and aluminum alloy materials at relatively low temperature without premature solidification of the brazing alloy.

It is a further object of the invention to provide a method of dip brazing aluminum and aluminum alloy materials which may be carried out at relatively low temperatures while maintaining the necessary fluidity and capillarity to promote the flow of the molten brazing metal over and between the metal parts to be joined, until satisfactory bonding is attained.

It is a further object of the invention to provide a method of dip brazing thin walled aluminum and aluminum alloy materials at relatively low temperatures with sufficient rapidity to avoid the destruction of the thin walls of the material by alloying of the base metal.

It is a further object of the invention to provide a low temperature process of dip brazing aluminum and aluminum alloy material which employs a brazing alloy of aluminum and silicon, slightly hyper-eutectic with respect to silicon.

Still another object of the invention is to provide a process of dip brazing aluminum and aluminum alloy material in which a brazing alloy of aluminum and silicon is employed, and which may be carried out at a temperature only slightly higher than the melting temperature of the aluminum-silicon eutectic.

Figure 2:
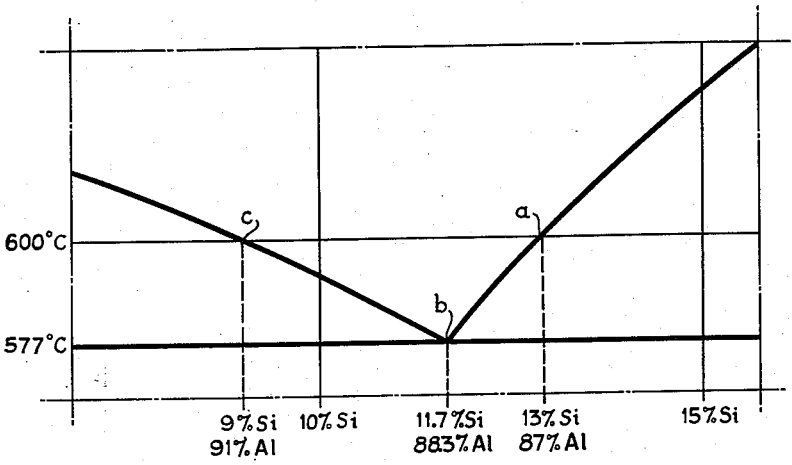

These and other objects are effected by my invention and will be apparent from the following descriptions and claims taken in connection with the accompanying drawing, in which Figure 1 is a diagram of the thermal equilibrium of the aluminum-silicon system; and Figure 2 is an enlargement of a portion of Figure 1, showing the various stages of my process.

It is the discovery of my invention that by employing a molten brazing alloy of aluminum and silicon wherein the silicon is present in slightly hyper-eutectic amount it is possible to effect the dip brazing of aluminum and aluminum alloys at relatively low temperatures. With my method fluidity and capillary flow are initially increased, the brazing alloy is eventually distributed between the surfaces which are to be joined by the brazing process, and the resultant bond is much improved over those obtained by following the prior art.

This result is obtained in accordance with my invention by using a molten brazing alloy of aluminum and silicon in which the amount of silicon slightly exceeds that required to form a eutectic mixture with the aluminum. The molten brazing alloy is maintained at a bath temperature slightly in excess of its liquidus temperature. The surfaces to be brazed are immersed in the molten brazing alloy bath and the filler alloy, that is, the brazing alloy within the joint, is permitted to absorb aluminum from them. This absorption is accompanied by a reduction in the liquidus temperature of the filler alloy, which thus prevents its premature solidification. The absorption is permitted to continue until sufficient aluminum has been absorbed to give the filler alloy a slightly hypo-eutectic composition with respect to silicon, whereupon the brazed aluminum surfaces are removed from the molten brazing alloy.

By using a brazing alloy of aluminum and silicon of slightly hyper-eutectic composition, I take advantage of two effects of interaction between the brazing alloy and the base metal of the material to be brazed. The first effect of interaction involves the absorption of a small amount of aluminum from the surface of the base metal to be brazed, which absorption alters the composition of the filler metal within the joint and causes it to approach the eutectic composition, thereby lowering its liquidus temperature and causing it to become more and more fluid, until the eutectic composition is reached. As this enrichment in aluminum occurs, flow and capillarity into the joint are enhanced. The second effect of interaction is an extension of the first, but at this later stage the filler alloy of the joint absorbs aluminum in excess of the eutectic composition, whereupon its liquidus temperature begins to increase rapidly. A point is reached very quickly at which the liquidus temperature equals the bath temperature, thereby causing the metal of the joint to become substantially solid. In other words, the proportion of the solid phase to the liquid phase of the brazing alloy in the joint becomes so great as to cause the metal to become too viscous to flow farther or alloy further, at which point the joint solidifies and the brazing operation is complete.

My process will be more fully described by examining and explaining the condition of all materials at three different times during the process.

Although my process can be performed with hyper-eutectic aluminum-silicon alloys having compositions containing as high as 16% silicon, an alloy of this composition having a liquidus temperature appreciably below the melting point of pure aluminum, I prefer to use one having a composition of about 13% silicon and 87% aluminum.

Consider, then, that in one utilization of my invention aluminum material parts having thin walls of between .005 and .008 inch are joined by dipping them in a molten bath composed of 13% silicon and 87% aluminum at a temperature of 600° C.

At the instant the parts to be brazed are first dipped into the dip brazing bath, the condition of all the materials corresponds to the point $a$ on Figure 2. As the material is dipped the direction of capillary penetration of the brazing alloy is upward and between the members to be joined. Since the liquidus temperature of the aluminum-silicon filler alloy under these conditions is approximately 600—° C., or slightly lower than that of the bath temperature, its fluidity and capillarity are sufficient to effect an initial entrance between the members to be brazed.

An instant later, the condition of all the materials in the dip brazing bath corresponds to the point $b$ in Figure 2. At this point in the process the aluminum-silicon alloy in the joint, which had an original composition of 13% silicon and 87% aluminum, has been changed by absorption of aluminum from the surface of the base metal to an aluminum-silicon eutectic alloy having a composition of approximately 11.7% silicon and 88.3% aluminum. This change in composition causes a lowering of the liquidus point of the brazing alloy between the members from 600—° C. to approximately 577° C. Under these conditions the fluidity of the filler alloy is greatly increased, and at the bath temperature of 600° C. it is able to penetrate easily and very rapidly between the members to be joined.

With respect to the third and so-called final stage of the process, the condition of all the materials in the brazing bath corresponds to the point $c$ on Figure 2. At this point the aluminum-silicon filler alloy, which had an original composition of 13% silicon and 87% aluminum, and which had been rendered eutectic by the absorption of aluminum from the surfaces of the base alloy, is now changed by still further absorption of aluminum to a hypo-eutectic alloy of aluminum and silicon having a composition of approximately 9% silicon and 91% aluminum. As may be clearly understood by referring to Figure 2, this further absorption of aluminum by the filler alloy results in an increase in the liquidus point of the filler alloy to 600+° C. Since, under the operating conditions employed, the bath temperature is maintained at 600° C., the brazing alloy in the joint now solidifies to form a very satisfactory juncture of the members being brazed.

It will be evident from the foregoing that my invention provides a method for effecting the dip brazing of aluminum and its alloys in mixtures of aluminum and silicon, which method may be carried out at a relatively low temperature while maintaining the necessary fluidity to effect very rapid capillary flow of the brazing alloy between the members to be brazed, and without danger of alloying too extensively or burning through the thin walls of the base metal, an especially important feature, for example, in the fabrication of heat exchangers having thin-walled sections joined by dip brazing.

I claim:

1. A process for the dip brazing of thin-walled articles of aluminum and its alloys, said articles consisting of an assembly of parts to be joined having capillary spaces between surfaces thereof; said process comprising: preparing a brazing bath of hyper-eutectic aluminum having a silicon content of 16% or less, and maintaining said bath at substantially its liquidus temperature; dipping said assembly in said bath so that surfaces contacted by the bath give up aluminum to the bath immediately adjacent said surfaces to form therewith the eutectic and thereby assist the capillary flow along said surfaces to be joined, whereafter further alloying of surface aluminum and eutectic bath causes the hypo-eutectic to be formed as the bond between said surfaces to be joined; and thereafter removing the assembly from the bath.

2. A process for the dip brazing of thin-walled articles of aluminum and its alloys, said articles consisting of an assembly of parts to be joined having capillary spaces between surfaces thereof; said process comprising: preparing a brazing bath of an aluminum and silicon hyper-eutectic composition of such proportions that the liquidus temperature is lower than the melting point of the articles to be brazed, and maintaining said bath at substantially said liquidus temperature; dipping said assembly in said bath so that surfaces contacted by the bath give up aluminum to the bath immediately adjacent said surfaces to form therewith the eutectic and thereby assist the capillary flow along said surfaces to be joined, whereafter further alloying of surface aluminum and eutectic bath causes the hypo-eutectic to be formed as the bond between said surfaces to be joined; and thereafter removing the assembly from the bath.

3. A process for the dip brazing of articles of aluminum and its alloys, said articles consisting of an assembly of parts to be joined having capillary spaces between surfaces thereof; said process comprising: preparing a brazing bath of hyper-eutectic aluminum having a silicon content of 16% or less, and maintaining said bath at substantially its liquidus temperature; dipping said assembly in said bath so that surfaces contacted by the bath give up aluminum to the bath immediately adjacent said surfaces to form therewith the eutectic and thereby assist the capillary flow along said surfaces to be joined, whereafter further alloying of surface aluminum and eutectic bath causes the hypo-eutectic to be formed as the bond between said surfaces to be joined; and thereafter removing the assembly from the bath.

4. A process for the dip brazing of articles of aluminum and its alloys, said articles consisting of an assembly of parts to be joined having capillary spaces between surfaces thereof; said process comprising: preparing a brazing bath of an aluminum and silicon hyper-eutectic composition of such proportions that the liquidus temperature is lower than the melting point of the articles to be brazed, and maintaining said bath at substantially said liquidus temperature; dipping said assembly in said bath so that brazing alloy which is to form the bond between said surfaces alloys with aluminum from said surfaces to first lower the liquidus temperature of said bonding alloy to the eutectic and thereby assist the capillary flow of said bonding alloy along said surfaces, and to then raise the liquidus temperature of said bonding alloy to the hypo-eutectic by further alloying of said bonding alloy with aluminum from said surfaces until the hypo-eutectic bond between said surfaces has a composition whose liquidus temperature is equal to or greater than that of said bath; and thereafter removing the assembly from the bath.

HAROLD H. BLOCK.

References Cited in the file of this patent

UNITED STATES PATENTS

| Number | Name | Date |
| --- | --- | --- |
| 1,651,709 | Jones | Dec. 6, 1927 |
| 1,691,532 | Spengler | Nov. 13, 1928 |
| 2,258,681 | Hoglund | Oct. 14, 1941 |
| 2,299,166 | Miller | Oct. 20, 1942 |
| 2,303,416 | Woods | Dec. 1, 1942 |
| 2,343,402 | Clifford | Mar. 7, 1944 |
| 2,373,117 | Hobrock | Apr. 10, 1945 |
| 2,380,107 | Hobrock | July 10, 1945 |
| 2,396,730 | Whitfield | Mar. 19, 1946 |
| 2,417,662 | Rosales | Mar. 18, 1947 |
| 2,426,467 | Nelson | Aug. 26, 1947 |
| 2,443,574 | Burns | June 15, 1948 |

FOREIGN PATENTS

| Number | Country | Date |
| --- | --- | --- |
| 591,343 | Great Britain | Aug. 14, 1947 |

OTHER REFERENCES

The Weld. Journal, May 1945 (Low Temp. Join. by R. D. Wasserman), p. 454, col. 3.